US011475091B1

(12) United States Patent
Itänen et al.

(10) Patent No.: US 11,475,091 B1
(45) Date of Patent: Oct. 18, 2022

(54) SESSION SUBSCRIPTION FOR COMMERCE EVENTS

(71) Applicant: Shopify Inc., Ottawa (CA)

(72) Inventors: Niklas Itänen, Ottawa (CA); Cameron Morgan, Ottawa (CA)

(73) Assignee: Shopify Inc., Ottawa (CA)

( * ) Notice: Subject to any disclaimer, the term of this patent is extended or adjusted under 35 U.S.C. 154(b) by 0 days.

(21) Appl. No.: 17/243,641

(22) Filed: Apr. 29, 2021

(51) Int. Cl.
| | | |
|---|---|---|
| G06F 16/954 | (2019.01) |
| H04L 67/02 | (2022.01) |
| G06Q 30/06 | (2012.01) |
| G06Q 10/10 | (2012.01) |
| G06Q 30/02 | (2012.01) |

(52) U.S. Cl.
CPC .......... *G06F 16/954* (2019.01); *G06Q 10/10* (2013.01); *G06Q 30/02* (2013.01); *G06Q 30/0615* (2013.01); *G06Q 30/0641* (2013.01); *H04L 67/02* (2013.01); *G06F 2216/15* (2013.01)

(58) Field of Classification Search
None
See application file for complete search history.

(56) References Cited

U.S. PATENT DOCUMENTS

| | | | | |
|---|---|---|---|---|
| 6,912,507 B1* | 6/2005 | Phillips | .............. | G06Q 30/0639 705/26.8 |
| 7,647,247 B2* | 1/2010 | Abraham | ........... | G06Q 30/0633 705/26.8 |
| 7,720,722 B2* | 5/2010 | Ho | .......... | G06Q 30/02 705/26.8 |
| 7,970,661 B1* | 6/2011 | Abraham | ........... | G06Q 30/0239 705/26.1 |
| 9,865,013 B1* | 1/2018 | Tsing | ................. | G06Q 30/0631 |
| 10,002,337 B2* | 6/2018 | Siddique | ............... | G06Q 30/06 |
| 10,127,590 B2* | 11/2018 | Bawge | .................. | G06Q 50/01 |
| 10,169,806 B1* | 1/2019 | Golwalkar | ......... | G06Q 30/0633 |
| 10,296,962 B2* | 5/2019 | Abraham | ............... | G06Q 30/06 |
| 11,232,499 B2* | 1/2022 | Hwang | ................ | G06Q 20/209 |
| 2005/0096997 A1* | 5/2005 | Jain | .................... | G06Q 30/0601 705/26.1 |
| 2006/0122895 A1* | 6/2006 | Abraham | ................ | G06Q 30/02 705/26.8 |
| 2012/0185355 A1* | 7/2012 | Kilroy | ................ | G06Q 30/0633 705/26.8 |
| 2012/0197753 A1* | 8/2012 | Kalin | ................. | G06Q 30/0633 705/26.8 |

(Continued)

*Primary Examiner* — Lashonda Jacobs-Burton
(74) *Attorney, Agent, or Firm* — Rowand LLP

(57) ABSTRACT

Methods and systems for subscription to retail browsing sessions. While two users are independently browsing the same merchant's store in parallel, the system may enable sharing or cross-sharing of commerce event data from a first user's browsing session to be injected into the other user's browsing session, so that the other user may follow along with the first user's browsing activity. The sharing may be dependent upon the first user enabling a live browse event and the other user subscribing to it. The sharing may be dependent upon subscribers having an active browsing session in the same merchant store as the first user's browsing session. To the extent that a subscribing user navigates to a different merchant or store, the sharing of commerce event data may be stopped or reduced to reflect the fact that the two users are no longer browsing the same merchant location in parallel.

20 Claims, 7 Drawing Sheets

(56) References Cited

U.S. PATENT DOCUMENTS

| | | | | |
|---|---|---|---|---|
| 2013/0117378 A1* | 5/2013 | Kotorov | ............... | G06Q 50/01 |
| | | | | 709/205 |
| 2013/0211953 A1* | 8/2013 | Abraham | ............... | G06Q 30/06 |
| | | | | 705/26.8 |
| 2013/0268331 A1* | 10/2013 | Bitz | ............... | G06Q 30/0631 |
| | | | | 705/26.7 |
| 2014/0278862 A1* | 9/2014 | Muppala | ............ | G06Q 30/0613 |
| | | | | 705/14.16 |
| 2014/0279235 A1* | 9/2014 | Sandholm | .......... | G06Q 30/0613 |
| | | | | 705/26.41 |
| 2015/0142591 A1* | 5/2015 | High | ............... | G06Q 30/0613 |
| | | | | 705/26.41 |
| 2016/0078508 A1* | 3/2016 | Cao | ............... | G06Q 30/0641 |
| | | | | 705/26.2 |
| 2016/0117758 A1* | 4/2016 | Bleakley | ............ | G06Q 30/0643 |
| | | | | 705/26.9 |
| 2016/0125507 A1* | 5/2016 | Bueno Lobl | ....... | G06Q 30/0613 |
| | | | | 705/26.41 |
| 2016/0210602 A1* | 7/2016 | Siddique | ............ | G06Q 20/321 |
| 2019/0391858 A1* | 12/2019 | Studnicka | ............ | G06Q 20/227 |

\* cited by examiner

SESSION SUBSCRIPTION FOR COMMERCE EVENTS

TECHNICAL FIELD

The present disclosure relates to online commerce events and, in particular, methods and system to enable live joint browsing.

BACKGROUND

Online shopping is a solitary event in which a user independently browses a catalog of items available from an online store using a computing device. Many users view online shopping as inferior to the real-world experience of shopping together with friends in bricks-and-mortar retail locations. It would be advantageous to provide for methods and systems that facilitate an improved online shopping experience.

BRIEF DESCRIPTION OF THE DRAWINGS

Embodiments will be described, by way of example only, with reference to the accompanying figures wherein.

DETAILED DESCRIPTION

Figure 1:
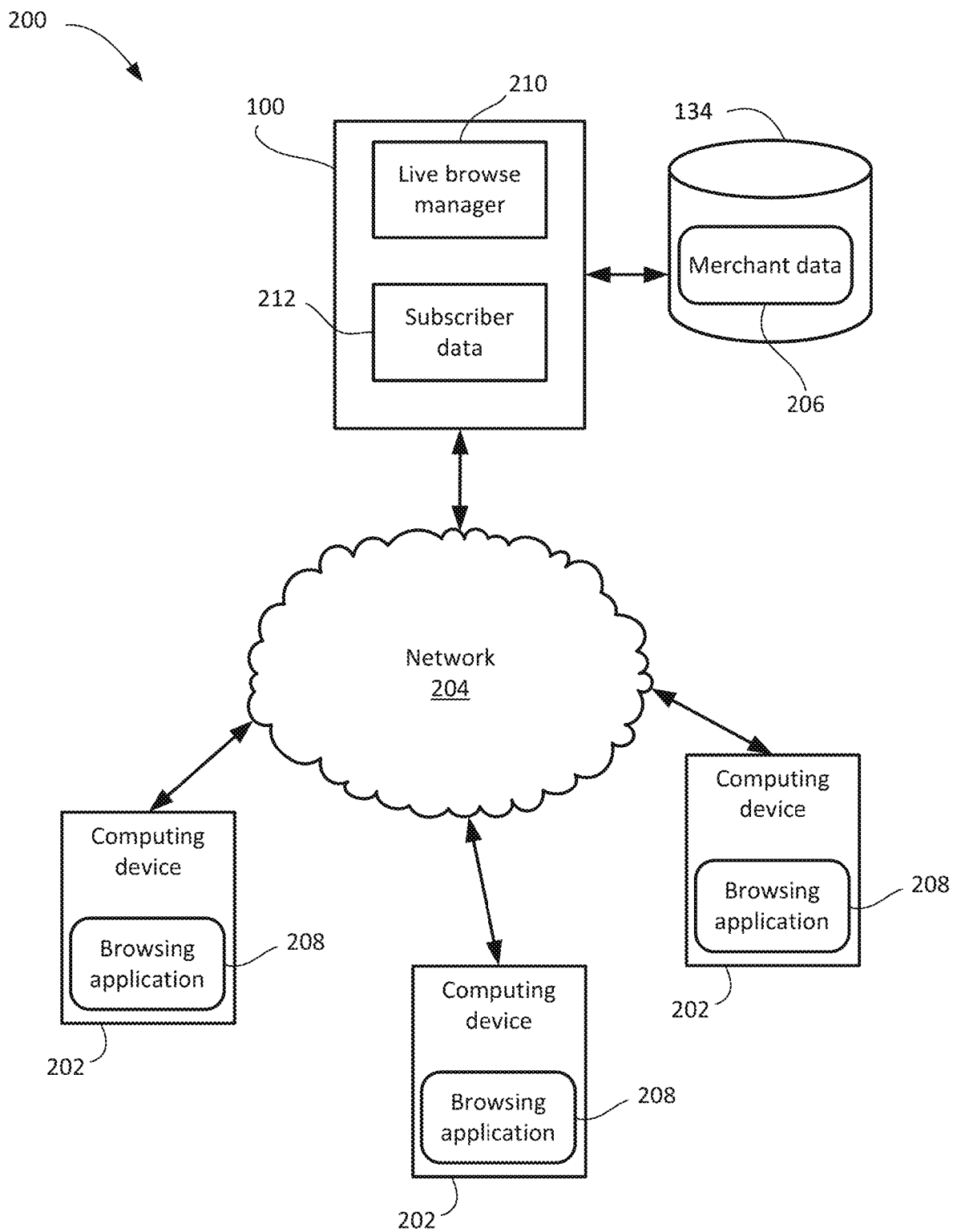
FIG. 1 is a block diagram of an example system for subscription to commerce events based on parallel active browsing sessions.

In an aspect, the present application discloses a computer-implemented method. The method may include receiving commerce event data relating to a first active browsing session by a first user device, wherein the first active browsing session is associated with a first merchant store; identifying a set of users subscribed to the first active browsing session and a subset of the set of users, wherein the users of the subset are engaged in respective active browsing sessions associated with the first merchant store; and transmitting the commerce event data to a user device associated with each user in the subset of users for injection into that user's respective active browsing session.

In some implementations, the commerce event data includes one or more of selection of a product to view details, selection of a product feature, addition of a product item to a shopping cart, or purchase of a product item.

In some implementations, the method may include determining session state for each of the respective active browsing sessions, wherein session state is one of a browsing state, a shopping cart review state, or a purchase completion state, and wherein transmitting includes transmitting to the user device associated with each user in the subset of users not in a purchase completion state.

In some implementations, the method may include receiving further commerce event data and re-filtering the set of users to select a second subset of users, wherein a second user in the subset of users is not included in the second subset of users because the second user has altered its respective active browsing session to be associated with a second merchant different from the first merchant.

In some implementations, wherein the commerce event data may include user commentary data input at the first user device, wherein the user commentary data includes one or more of text data, voice data, or video data, and wherein the user commentary data is associated with one or more products displayed in the first active browsing session. In such cases, transmitting may include transmitting the user commentary data and data regarding the one or more products associated with the user commentary data.

In some implementations, the set of users are cross-subscribed to each other's respective active browsing sessions in a group browsing event.

In some implementations, the method may include receiving the commerce event data at the user device associated with each user in the subset and, at each user device, determining whether to output a notification regarding the commerce event data. In some cases, determining whether to output the notification includes determining session state for each of the respective active browsing sessions, wherein session state is one of an active browsing state, a shopping cart review state, or a purchase completion state, and outputting the notification if the respective active browsing session is not in the purchase completion state.

In some implementations, the method may include receiving the commerce event data, at the user device associated with each user in the subset and, at each user device, outputting a user interface having a first portion for display associated with the respective active browsing session and having a second portion for display associated with the received commerce event data. In some cases, the second portion is selectable and, when selected, causes the respective browsing session to display a product identified by the commerce event data.

In another aspect, the present application discloses a computing system. The computing system includes a processor and a memory storing computer-executable instructions that, when executed, are to cause the processor to: receive commerce event data relating to a first active browsing session by a first user device, wherein the first active browsing session is associated with a first merchant store; identify a set of users subscribed to the first active browsing session and a subset of the set of users, wherein the users of the subset are engaged in respective active browsing sessions associated with the first merchant store; and transmit the commerce event data to a user device associated with each user in the subset of users for injection into that user's respective active browsing session.

In yet another aspect, the present application discloses a non-transitory, computer-readable medium storing computer-executable instructions that, when executed by a processor, are to cause the processor to carry out at least some of the operations of a method described herein.

Other example embodiments of the present disclosure will be apparent to those of ordinary skill in the art from a review of the following detailed descriptions in conjunction with the drawings.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . and . . . " is intended to cover any one or more of the listed elements, including any one of the listed elements alone, any sub-combination, or all of the elements, without necessarily excluding any additional elements, and without necessarily requiring all of the elements.

In the present application, the term "product data" refers generally to data associated with products that are offered for sale on an e-commerce platform. The product data for a product may include, without limitation, product specification, product category, manufacturer information, pricing details, stock availability, inventory location(s), expected delivery time, shipping rates, and tax and tariff information. While some product data may include static information (e.g., manufacturer name, product dimensions, etc.), other product data may be modified by a merchant on the e-commerce platform.

In the present application, the term "e-commerce platform" refers broadly to a computerized system (or service, platform, etc.) that facilitates commercial transactions, namely buying and selling activities over a computer network (e.g., Internet). An e-commerce platform may, for example, be a free-standing online store, a social network, a social media platform, and the like. Customers can initiate transactions, and any associated payment requests, via an e-commerce platform, and the e-commerce platform may be equipped with transaction/payment processing components or delegate such processing activities to one or more third-party services. An e-commerce platform may be extendible by connecting one or more additional sales channels representing platforms where products can be sold. In particular, the sales channels may themselves be e-commerce platforms, such as Facebook Shops™, Amazon™, etc.

In the present application, the term "browsing session" or "active browsing session" may refer to an active session on a user device in connection with a particular merchant's offerings. This may include a web browser session via http, https, etc., with respect to a merchant's website, an e-commerce platform hosting a merchant site, or the like. In some cases, instead of a web browser, the browsing session may occur using a dedicated application, such as a mobile or desktop app, relating to an e-commerce platform, a social network having an integrated e-commerce site, or a merchant-hosted platform. The browsing session may be any online commerce session in which a user device connects to and navigates a merchant-provided site (whether hosted by the merchant or a third-party service) to browse available product items and, if desired, initiate purchases of product items. In some cases, an "active" browsing session is one in which a user device has a session established with a merchant website using a web browser, or in which a user device has a running commerce or social media application that has an active connection with a server hosting merchant store data, such as an e-commerce platform. In some cases, an "active" browsing session is one in which the web browser or web browser tab or application is the "active" window on the user device, as opposed to a background process.

One of the attractions of conventional in-person shopping is that it is a social activity in which pairs or groups of friends may browse items in a store, discuss them, show each other items of interest, and purchase them in a collegial and collaborative manner. Conversely, online shopping is a solitary activity in which a single shopper browses and purchases items on their own.

In one aspect the present application provides for an improved online commerce experience through methods and systems that enable collaborative online shopping. In particular, users may enable subscription to their respective browsing sessions. While two users are independently browsing the same merchant's store in parallel, the system may facilitate the cross-sharing of browsing data so that one user receives commerce event data regarding the other user's browsing activity. The sharing may be dependent upon one user enabling sharing or subscription to their browsing activity and the other user subscribing to that activity. In some implementations, the system may employ a publication-subscription ("pub-sub") model for commerce event data sharing. Moreover, the sharing may be dependent upon both users having active browsing sessions in the same merchant store. To the extent that one user navigates to a different merchant or store, the sharing may be stopped or reduced to reflect the fact that the two users are no longer browsing the same merchant location in parallel.

In some cases, the sharing may be cross-sharing, such as in the case where two or more friends are engaged in online shopping together and wish to cross-share browsing data with each other. In some cases, the sharing may be from a first user to a plurality of other users that are also engaged in active browsing sessions at the same merchant, but who are not sharing their browsing data with the first user. The latter situation may be one in which a celebrity shopper, tour guide, or style consultant (e.g. a "host") enables others to join them to shop alongside them, but the host does not wish to subscribe to commerce events from the users engaged in parallel shopping at the same merchant.

Reference will first be made to FIG. 1, which diagrammatically shows a simplified example system 200 for subscription to commerce events based on parallel active browsing sessions. The system 200 may include an e-commerce platform 100 and one or more computing devices 202 that may connect to the e-commerce platform 100 via a network 204. The network 204 may include a plurality of computing networks, and may include wired and/or wireless networks, including the Internet.

An example implementation of the e-commerce platform 100 described in further detail later. For the purposes of this example, the e-commerce platform 100 includes one or more computing devices, such as servers, that facilitate online commerce. In one example, the e-commerce platform 100 may include a web server hosting an online commerce portal for a single merchant. In some examples, the e-commerce platform 100 may include a web server hosting a plurality of online commerce portals or websites for a plurality of merchants. In some cases, the e-commerce platform 100 is a server supporting a social network or other multi-user application that has a commerce component through which multiple different merchants may build and provide online "stores" through which users of the social network application may browse and purchase products. In some cases, the e-commerce platform 100 is a dedicated e-commerce platform designed to host a plurality of merchants and enable them to build and design their virtual storefronts.

The e-commerce platform 100 may include a data repository 134 for storing data, including merchant data 206. The merchant data 206 may include data relating to merchants, their online stores, product items, customer data, sales data, or other data relating to e-commerce activity on the e-commerce platform 100. Although shown as a separate stand-alone repository for ease of illustration, it will be appreciated that the data repository 134 may be implemented using one or multiple data storage units and may be integrated within or separate from the servers implementing the e-commerce platform 100.

The computing devices 202 may each include a browsing application 208. The browsing application 208 may include a generic web browser in some implementations, a merchant-specific browsing application in some implementations, a social media application in some implementations, or a dedicated e-commerce application in some implementations. Using the browsing application 208, the computing devices 202 may establish respective browsing sessions with one the e-commerce platform 100. That is, one of the computing devices 202 may connect to the e-commerce platform 100 via the network 204. The connection may include the exchange of identifying data, such as user credentials, in some cases. The connection may include establishing an active session, such as an HTTP or HTTPS session, with the e-commerce platform. In some cases, the session may relate to a specific merchant, such as when the browsing application is used to navigate to a domain or subdomain associated with that merchant at which the merchant's online product offerings are made available for browsing, selection, and purchase.

Among other functions and features, the e-commerce platform 100 may include a live browse manager 210. The live browse manager 210 may facilitate the sharing of browsing information from one user to another user based on establishment of a live browse session or event by one user, and the subscription to that event by one or more other users. In this regard, the live browse manager 210 may maintain a record for each live browse event initiated. For instance, a first user may, via a first one of the computing devices 202, transmit an instruction to generate a live browse event. The live browse event may be designed to make that first user's commerce events during their active browsing session available for sharing to subscribers. Other users may request subscription to the live browse event. In some cases, the first user may share an identifier, a link, or other information regarding the live browse event with other users to enable them to submit a request to subscribe. In some cases, the live browse event may be restricted to authorized users through requiring a password or requiring that the first user approve the sharing. In some other cases, the live browse event may be public and may enable any other user to subscribe.

The live browse manager 210 tracks the subscribed users and, in particular, their respective computing devices 202 and associated browsing session(s), if any. Subscriber data 212 may be stored in memory and maintained by the live browse manager 210 to enable the live browse manager to make commerce event data available to subscribers as it is received and based on various criteria.

Commerce event data may include any commercial or retail activity within the first browsing session by the first user. For example, commerce events may include navigation to or departure from a particular merchant store, selection of a product to view product details, selection of a product feature (e.g. colour, size, etc.), selection of product for inclusion in a shopping cart, purchase of a product, or other similar commerce events.

The commerce event data may be made available to subscribers through a push model in some instances in which the e-commerce platform 100, in particular the live browse manager 210 in some cases, actively transmits commerce event data relating to the live browse event to the computing devices 202 of subscribers, subject to various criteria. In some cases, the e-commerce platform may passively make the commerce event data available at the e-commerce platform 100 in a pull model, in which computing devices 202 of subscribers may periodically or occasionally poll the e-commerce platform 100 for updates to any new commerce event data for subscribed live browse events.

Among the criteria used to determine whether to send or make available commerce event data to a subscriber may be the state of the subscriber's browsing session. That is, the commerce event data may be shared with subscribers if those subscribers also have an active browsing session alive with respect to the same merchant portal as the live browse session. In other words, if they are "in the same store", in a virtual sense.

The computing devices 202 that obtain or receive commerce event data relating to the subscribed live browse session may inject some or all of that content into the active browsing session on that computing device 202. The computing devices 202, in particular the browsing applications 208, may provide a GUI display that includes both information and images relating to the user's active browsing session and information and images relating to the injected commerce event data from the live browse session to which the user subscribed. The nature of the injection may vary in part dependent upon the type of commerce event. The nature of the injection may further vary in part dependent upon the status of the user's current active browsing session. For instance, the browsing application 208 may not inject commerce event data if the active browsing session is in a check-out or purchase completion state.

In some examples, two or more users cross-share commerce event data with each other in a group browsing event, which enables groups of two or more users to engage in online shopping in parallel. In some cases, the group browsing event may be implemented as a single live browse event in which each user is both a host and a subscriber. In some cases, the group browsing event may be implemented as a plurality of live browse events in which each user is a host of one of the live browse events and is a subscriber to all of the other live browse events of the group. The system may impose maximum participation caps on group browsing events to make the sharing manageable, such as 4, 6 or 10 users per group for example.

Figure 2:
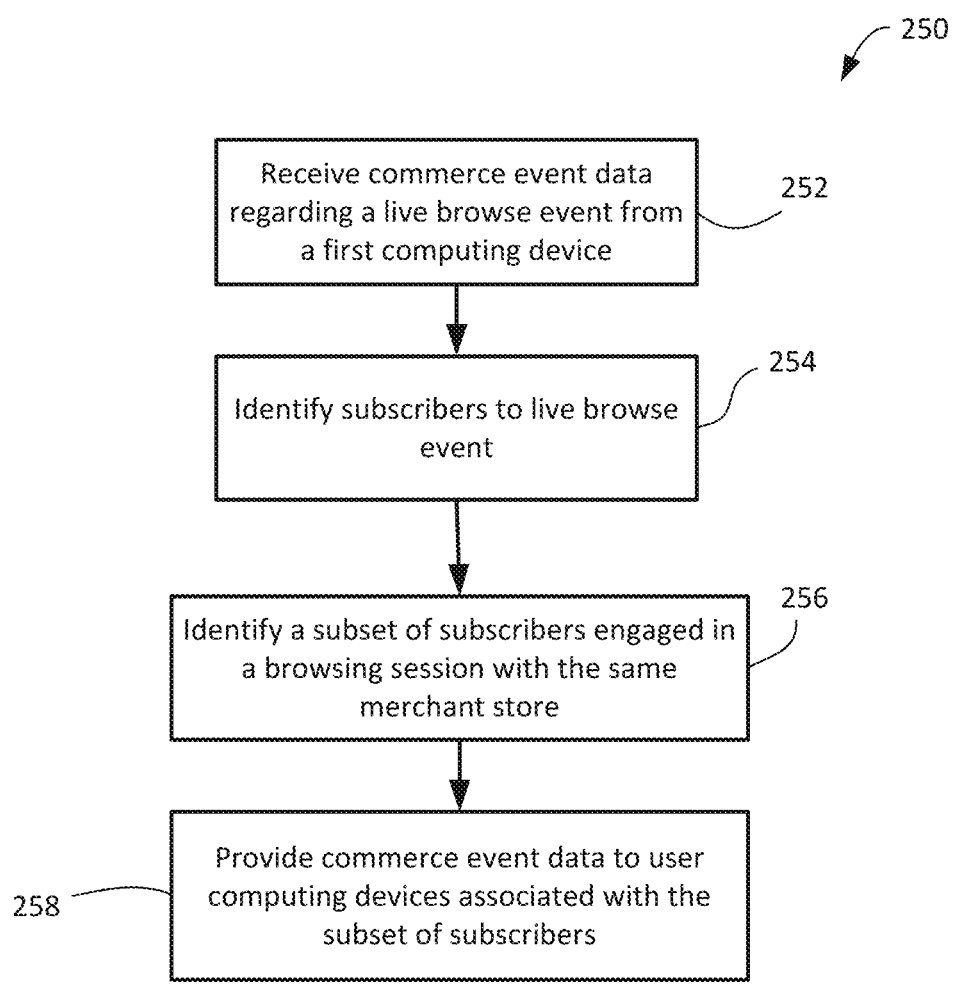
FIG. 2 shows, in flowchart form, an example method of sharing commerce event data based on parallel active browsing sessions.

Reference is now made to FIG. 2, which shows one simplified example of a method 250 of subscribing to commerce events based on parallel active browsing sessions. The method 250 may be implemented by a computing device having suitable computer-executable instructions for causing the computing device to carry out the described operations. The method 250 may be implemented, in whole or in part, using one or more servers providing the e-commerce platform 100. The method 250 may be carried out by the live browse manager 210, which itself may be implemented by way of processor-executable instructions stored in memory at one or more servers and which, when executed by one or more processors, causes the one or more servers to carry out the described operations.

The method 250 may be carried out in connection with a live browse event established by a first user. The first user may have an associated first user device connected to the e-commerce platform in a browsing session. The browsing session may be associated with a particular merchant. Data stored at the e-commerce platform in connection with the live browse event may include a first user identifier and an identifier for the merchant and/or the merchant location currently being browsed by the first user as part of the live browse event.

In operation 252, the platform receives commerce event data associated with the live browse event. On receipt of the commerce event data, the platform may determine which live browse event or event record is associated with the commerce data. The live browse event may have a unique event identifier that is included in both the message providing the commerce data and the stored record or records regarding the live browse event. The commerce event data may include browsing activity by the first user within their browsing session. For instance, the commerce event data may include display of a product item, selection of a product feature or option, adding or removal of a product item from a shopping cart, or purchase of a product item.

Not all browsing activity is included in commerce event data. Certain data may be considered private non-sharable data. For instance, when the first user completes a purchase of an item, the delivery location, credit card details, or other information regarding the purchase may be excluded from commerce event data. In some cases, price may be excluded.

In some cases, commerce event data may include commerce event metadata. Where commerce event data includes browsing session activity such as products selected or purchased, the commerce event metadata may include supplemental data regarding the browsing session activity. The metadata may include, for example, multimedia input received at the first user device. Examples may include text chat, voice chat, video, emojis, or other multimedia input received at the first user device and relayed to the platform.

The commerce event data may be received by the platform from the first user device. In some instances, the live browse manager listens for and intercepts commerce event data being passed between the browsing application on the computing device and a commerce component on the platform, such as a web server for receiving and responding to HTTP/HTTPS requests from the browsing application. That is, the live browse manager detects receipt by the web server of a request from the browsing application for a particular web page, or providing a product option parameter, or instructing addition of an item to a shopping cart data structure, etc. The live browse manager may monitor the browsing session of any computing device that has initiated a live browse event.

Once the platform receives new commerce event data indicative of some activity in the first user's browsing session, then in operation 254 the platform identifies subscribers to the live browse event. This may be specified in a live browse event record retrieved in operation 252 based on an event identifier received with the commerce event data. The subscribers may be identified by way of a user identifier, where users of the platform are registered and have unique identifiers associated with them. The subscribers may be identified by way of a computing device IP address and port, or by way of a MAC address, or by way of a session token or number.

In operation 256, the platform determines which of the subscribers are engaged in actively browsing the same merchant/store. Some of the subscribers may have subscribed and may no longer have an active connection to the e-commerce platform, e.g. they may have closed the browsing application, turned off their computing device, or lost network connectivity. Some subscribers may still have an active connection to the e-commerce platform but may have navigated to a different merchant or ceased browsing of merchants altogether. For instance, in the case where the browsing application is a social media application with a commerce component, the user may be engaged in other social media-related activity and not browsing any merchant sites. In some cases, the subscriber may still be browsing products on the e-commerce platform but may be browsing the catalog of a different merchant. Operation 256 may result in identifying a subset of subscribers that are actively engaged in browsing, via their respective browsing applications, the same merchant as the first user that initiated the live browse event.

In operation 258, the platform provides commerce event data to the subset of subscribers. This may include proactively transmitting the commerce event data to the computing devices associated with the subset of subscribers or making the commerce event data available on the platform to those computing devices. The commerce event data may then be injected into the browsing sessions being carried out on the respective computing devices of the subset of subscribers, so that those subscribers are aware of what activity has occurred in the first user's live browse event.

The nature of the injection may depend on the type of commerce event. In some cases, different notifications, pop-ups, symbols/emojis, video, text, or image announcements may be output by the browsing applications to signal different types of commerce events. In some implementations, a browsing event, such as viewing a product or selecting a product option parameter, may be injected by way of showing the same product or text regarding the same product in a dedicated live browse event field or window in the user's own browsing session. If the commerce event is a metadata event, such as a first user text chat, or first user voice input, that may be output by the browsing application. If the commerce event is a shopping cart purchase event, then the browsing application may output a different notification or display than for a browsing event.

In some cases, the browsing application may change the injection based on the state of the browsing session. That is, if the browsing session is in a particular state, such as a shopping cart review state or purchase completion state, then the commerce event may not be output or may be output in a different less obtrusive manner. Alternatively, the commerce event may be delayed and output after completion of the purchase, for example. In another implementation, instead of the browsing application determining whether or how to inject a commerce event based on the state of the browsing session, the e-commerce platform may make that determination and may forgo sending commerce event data to a device in certain browsing states. For instance, the live browse manager may receive or obtain data regarding the browsing state of subscribers and, after identifying the subset of subscribers, the live browse manager may exclude subscribers on the basis that their current browsing session is in a particular state, such a shopping cart review state or a purchase completion state.

In some embodiments, commerce event data may be classified into major commerce event data and minor commerce event data. The different classes of commerce event data may be handled differently by the live browse manager. For example, major commerce event data may include the first user navigating to a different merchant or purchasing a cart of items. Minor commerce event data may include viewing product items, selecting product options, or adding a product item to a shopping cart. The live browse manager may be configured to only send the minor commerce event data to the subset of subscribers engaged in browsing sessions at the same merchant, but may be configured to send major commerce event data more broadly. For instance, notification regarding a change of store by the first user may be sent to all subscribers, or to all subscribers having a current connection to the e-commerce platform.

Figure 3:
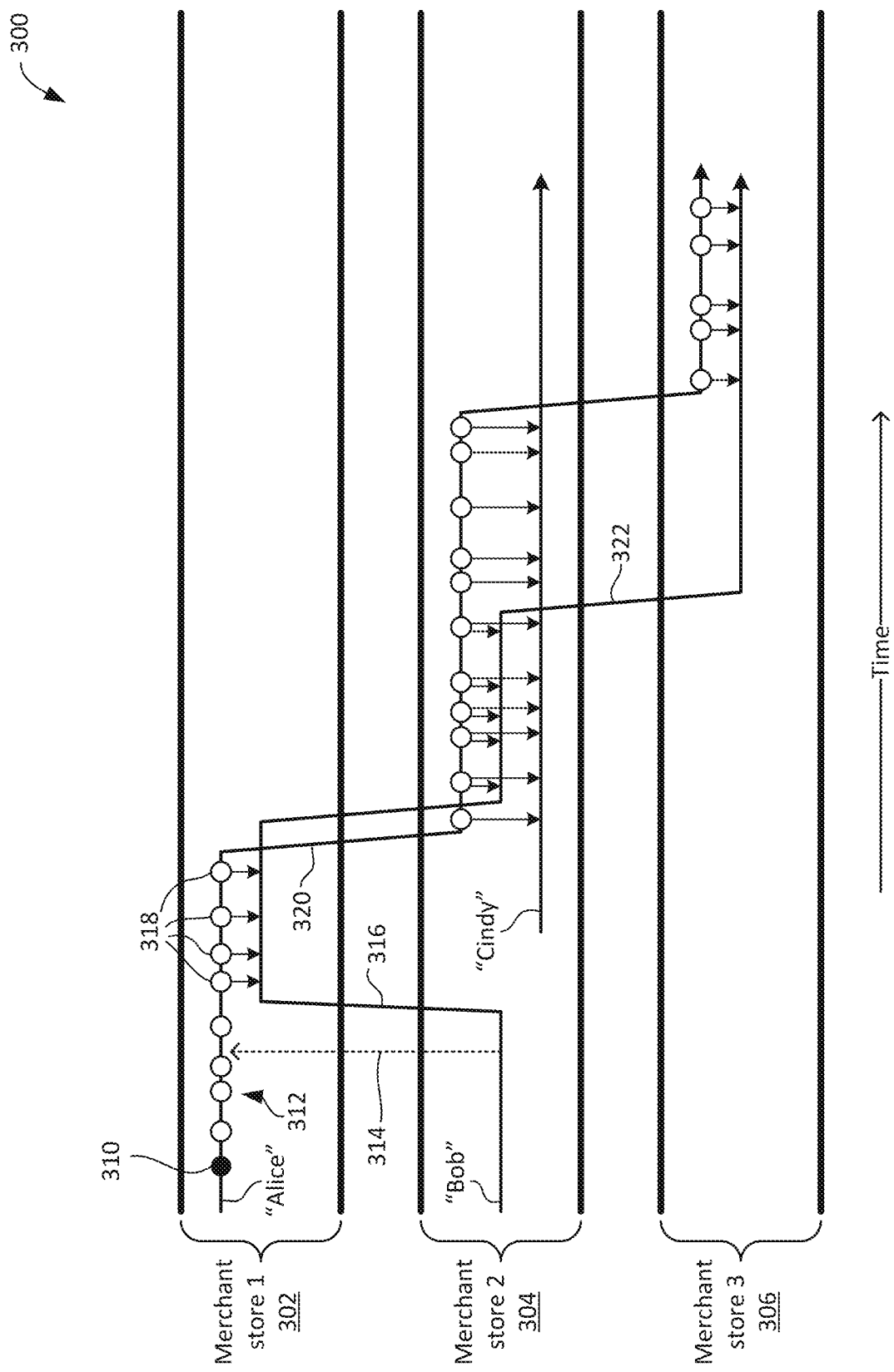
FIG. 3 illustrates an example timeline of shared commerce data relating to a live browse event.

An example process of relaying data relating to live browse events will now be diagrammatically illustrated with reference to the timeline 300 shown in FIG. 3. The example timeline 300 is based on an e-commerce platform that hosts a plurality of merchants, each merchant having an online store accessible to consumers for browsing and purchasing available product items from that merchant. A consumer accessing the e-commerce platform using a computing device and a browsing application may be in one "location", i.e. store, at a time, and may navigate into or out of stores by navigating to or leaving a merchant's webpages. In some cases, the consumer may be in no stores, e.g. may navigate to a portion of the virtual space provided by the e-commerce platform that does not correspond to a specific merchant. For instance, in some cases the e-commerce platform may provide "waiting room" or "lobby" webpages that correspond to no particular merchant, or correspond to a group of merchants but not one particular merchant, such as may be grouped together in a virtual "shopping mall". In another example, the platform may provide a map function to facilitate movement to different merchants and the viewing of available merchants in different geographical locations. In another example, the platform may provide other services, such as chat, networking, or other "rooms" to which a consumer may navigate instead of browsing merchant websites.

In this example, a first user, "Alice", establishes a browsing session using a first computing device and navigates to a first merchant's online store 302. At some point prior to or during Alice's browsing session, Alice causes the first computing device to send a command to the e-commerce platform to create a live browse session, as indicated by reference numeral 310. That is, Alice instructs that her browsing session be made available to subscribers. The live browse session may be public, to which any user may subscribe, or may be private, to which only designated users may subscribe. The designated users may receive an invitation message or notification regarding creation of the live browse event.

Alice may generate commerce events, such as viewing of product items etc. after creation of the live browse event but before any subscribers have subscribed to the live browse event and/or joined her in the first merchant's online store 302. As shown by reference numeral 312, those commerce events may be obtained by the e-commerce platform and, in particular, the live browse manager, but may not be provided to any other users since there are no subscribers at this point.

Meanwhile, a second user, "Bob" may have established a browsing session using a second computing device and may be browsing a second merchant's online store 304. As indicated by reference numeral 314, as some point in time, Bob may elect to subscribe to Alice's live browse event. Bob may do so as a result of an invitation message or notification from the platform regarding Alice's live browse event, or as a result of reviewing available live browse events and selecting to subscribe to Alice's live browse event, for example. Alice may receive a notification or other message alerting her to the addition of Bob as a new subscriber.

After subscription, Alice may continue to generate commerce events due to browsing activating within her browsing session at the first merchant online store 302; however, the platform may not provide data regarding those commerce events to Bob, or may provide only a subset of those events to Bob, based on the fact that Bob is not engaged in a parallel browsing session with Alice in the same store. Bob is still "located" in the second merchant's online store 304. Later, Bob may choose to join Alice in the first merchant's online store 302 by navigating with his browsing application to the website for the first merchant's online store 302, as shown by numeral 316. In some cases, Bob's browsing application may display a "Join" button or link as a result of Bob's subscription to the live browse event to make it easy for Bob to navigate to whichever store in which the live browse event is now taking place.

Once Bob's browsing session is co-located with Alice's browsing session in the same store, the first merchant's online store 302, then data regarding subsequent commerce events detected by the e-commerce platform with respect to Alice's browsing session may be provided to Bob's computing device, as indicated by reference numeral 318. As discussed above, the data regarding commerce events in Alice's browsing session may be injected into Bob's browsing session by Bob's browsing application. In another implementation, the e-commerce platform may inject the commerce event data into Bob's browsing application through modification at the server of the HTML pages served to Bob's computing device during his browsing session.

Accordingly, after joining Alice in the first merchant's online store 302, Bob continues with his independent browsing session but in parallel with Alice's active browsing session in the same store. As a result of Bob's subscription to Alice's live browse event and 'presence' in the same online store, Bob's browsing session is supplemented with data regarding Alice's parallel browsing session. Bob may thus follow along with Alice's browsing of the same store and may elect to view or select some of the same items, read or listen in on Alice's commentary on her shopping, or provide commentary or feedback on Alice's selections.

In this example, Alice is engaged in a live browse event that provides commerce event data to subscribers, but Bob has not created a corresponding live browse event, so Alice does not receive injected data regarding Bob's commerce events. In another example, Bob may initiate his own live browse event to which Alice subscribes such that they cross-share commerce events so as to be able to interactively shop in parallel. For simplicity of explanation, this example shows only Alice's live browse event.

A third user, "Cindy", may also subscribe to Alice's live browse event. Cindy may be engaged in an active browsing session in the second merchant's online store 304. As a result, despite subscribing, Cindy may not receive data regarding commerce events in Alice's browsing session, or may receive only a subset of the data, such as major commerce events, for example.

At some point during the live browse event, Alice may choose to navigate to a different merchant. In this example, at numeral 320, Alice navigates to the second merchant's online store 304. The change in stores may be a commerce event provided to subscribers. In some cases, injection of that commerce event may include a selectable "follow" button or link to enable Bob to have his browsing session navigate to the same store as Alice. Bob may elect to continue browsing the first merchant's online store 302, particularly if he has selected items he intends to purchase but has not yet completed or if he determines that Alice has navigated to a store in which he has little interest. In this example, however, Bob follows Alice by having his browsing application navigate to the second merchant's online store.

Now that Alice is in the same store as Cindy, Cindy's computing device begins to receive data regarding Alice's commerce events given that Cindy is a subscriber to the live browse event and is now browsing the same merchant in parallel with Alice. At this point, both Bob and Cindy receive data regarding Alice's commerce events.

At some point in the future, Bob may elect to leave the second merchant's online store 304 and navigate to a third merchant's online store 306, as indicated by numeral 322. He then ceases to receive data regarding Alice's commerce events in her browsing session at the second merchant's online store 304, while Cindy continues to receive that data. If Alice happens to later leave the second merchant's online store 304 and arrives at the third merchant's online store 306, then Bob may again start to receive data regarding commerce events for Alice's browsing session, whilst Cindy may cease to receive data regarding commerce events. It will be appreciated that some major commerce events may be made available to subscribers irrespective of whether the subscriber is in the same store or not, such as Alice's navigation to a different merchant.

Figure 4:
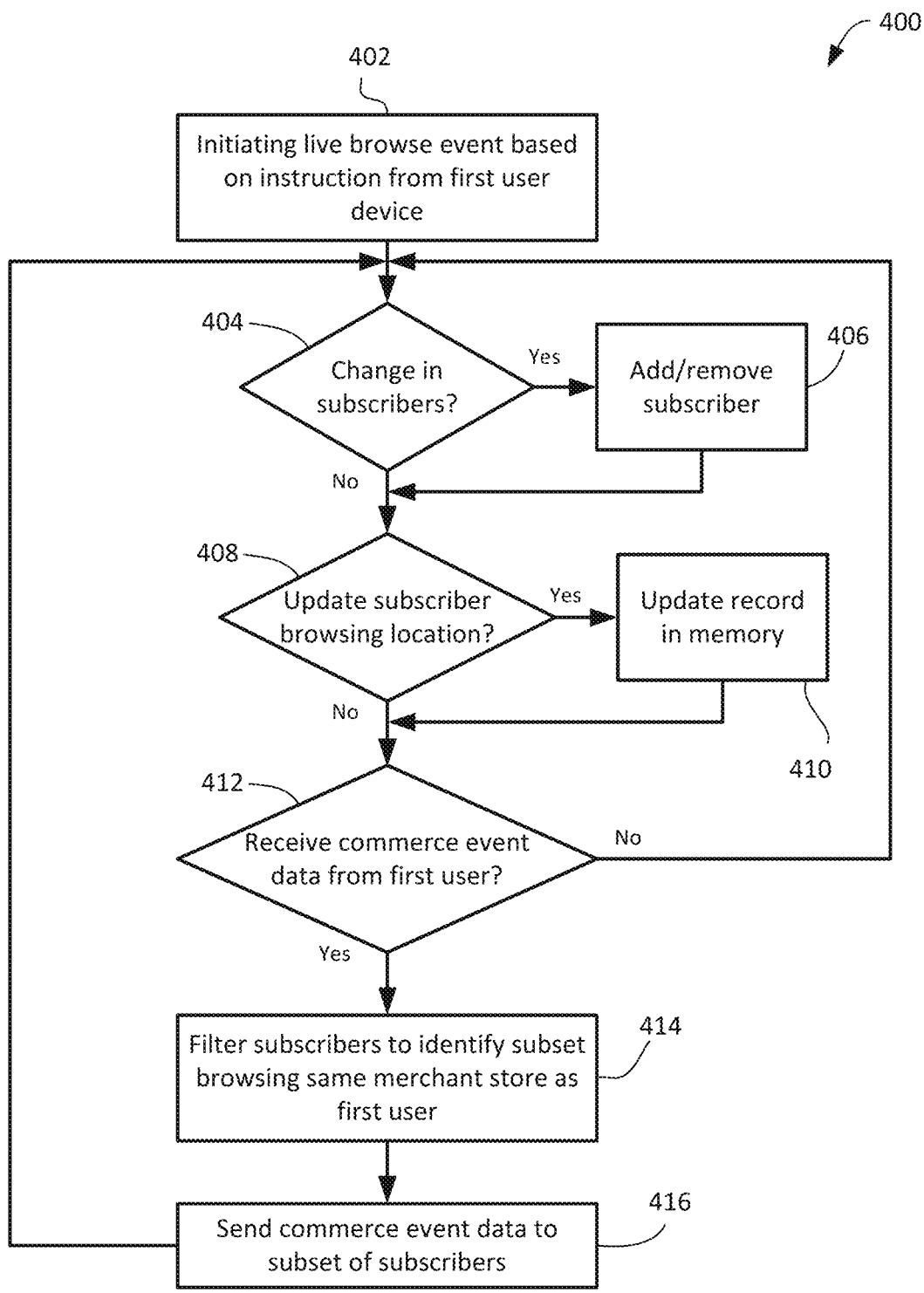
FIG. 4 shows, in flowchart form, an example method of managing a live browse event.

Reference will now be made to FIG. 4, which shows one example method 400 for managing a live browse event. The method 400 may be implemented, for example, by a server associated with an e-commerce platform. The method 400 may be implemented in some cases by a live browse manager, which may be embodied in a set of processor-executable instructions stored in memory on the server that, when executed by a processor on the server, cause the server to carry out the described operations. In some cases, the processor-executable instructions may be implemented as a standalone application or as a module or part of another application, such as a commerce management engine.

The method 400 may be initiated in operation 402 as a result of receipt of a live browse command from a first computing device. The first computing device may be associated with a first browsing session and/or a first registered user. The live browse command may be generated as a result of selection of a live browse event option within a browsing application on the first computing device. The command may include or be associated with a number parameters or settings for the live browse event. Parameters may include whether the event is public or private, or identification of authorized or designated subscribers. The parameters may include filtering parameters such as which commerce events are shared and which are not, or which events are shared only with the subset of subscribers "in the same store", versus subscribers engaged in active browsing sessions in other stores. The parameters may also include selected start and or stop times for the live browse event.

The server may generate a live browse event record for storing and/or tracking data regarding the live browse event. The record may include a unique identifier for the live browse event, an identifier for the first user, a first browsing session identifier or token, parameter data, subscriber data, and the like.

Once the live browse event begins, then in operation 404, the server determines whether there has been a change in subscribers. That is, the server may receive a request to subscribe or a request to unsubscribe from a second user. In operation 406, if such a request has been received then the server acts on that request to add or remove a subscriber. This may include applying authorization or eligibility criteria to the request and notifying the second user of the request is granted or refused. In some cases, a request to subscribe may be refused if the requested live browse event is private and the prospective subscriber is not a designated subscriber. It may be refused if the requested live browse event identifier is incorrect, does not exist, or if the event has ended. It may be refused if the prospective subscriber is on a blocked list of subscribers ineligible to subscribe to events initiated by the first user.

In some implementations, the server may track the "location" of each subscriber to the live browse event. That is, the server may store data regarding the active browsing session of each subscriber and, in particular, the merchant online store which each subscriber is currently browsing. The location of a subscriber may be stored by merchant identifier, store identifier, webpage domain, or other identifier. The location data for each subscriber may be stored in the live browse record in some embodiments. It may be stored in a separate record in some embodiments. In another implementation, the locations of subscribers are not tracked and stored by the server and, instead, when the server needs to identify the locations of subscribers it obtains that data from the subscribers active browsing sessions at the time.

In operation 408, the server may determine whether there has been an update in subscriber active browsing sessions. In particular, the server may determine whether one or more of the subscribers has changed "location" by navigating to a different merchant online store or ceasing to browse a merchant online store. The status of the subscriber browsing session may thus be updated in any record maintained by the server, if any, in operation 410. In some cases, the record of the subscribers browsing session includes status information in addition to location information. That is, the record may track the merchant at which a subscriber is browsing and may also track the status of that browsing session. Example statuses may include "active" to indicate active browsing of available product items or other merchant data, "dormant" to indicate a lack of interaction with the merchant site for more than a time-out period of time, "shopping cart review" to indicate that the user has navigated to a review page to assess the contents of a shopping cart data structure for possible purchase, or "purchase completion" to indicate that a purchase process has been initiated and the user is engaged in completing the process of finalize a purchase, which may include selecting shipping and billing options and processing payment.

In operation 412, the server determines whether there is new commerce event data relating to the live browse event. If not, then it returns to operation 404, but if there is new commerce event data relating to the active browsing session by the first computing device, then in operation 414 the server retrieves the subscribers to the live browse event and filters the subscribers to identify the subset of subscribers that are engaged in a browsing session in the same merchant store as the first browsing session that is the subject of the live browse event. In some cases, the filtering may further exclude subscribers that are in the same merchant store but have a certain browsing status, such as payment completion, on the basis that those users are likely engaged in a sensitive process and would not want their personal session interrupted at that stage by injection of commerce event data.

Once the subset of subscribers has been identified, then in operation 416 the server sends the new commerce event data to the computing devices associated with that subset of subscribers. In some cases, rather than proactively transmitting the commerce event data to those subscribers, the server makes that data available to them at the server and in response to subsequent polling inquiry/inquiries from one or more of those computing devices or their respective browsing applications, the server provides that commerce event data.

It will be appreciated that the nature of the filtering may be dependent on the type of commerce event. A major commerce event may correspond to filtering subscribers in operation 414 to identify subscribers that have an active browsing session with the e-commerce platform irrespective of the merchant store involved. Minor commerce events may be restricted to those subscribers at the same merchant store engaged in an active browsing session. In some cases, different event data may be sent to different subsets of subscribers. For instance, more detailed commerce event data may be sent to subscribers in the subset of subscribers, and less detailed commerce event data may be sent to subscribers outside the subset. As an example, if a commerce event involves viewing of a particular product item at a merchant, then subscribers in the subset may be sent rich product item details and a product item image, which may then be injected into their respective browsing sessions so that they are aware of the precise product being viewed in the parallel browsing session that is part of the live browse event. Conversely, subscribers not in the same store, i.e. outside the subset, may receive a limited notification regarding the product being viewed or merely that a class of product is being viewed. Rather than being injected into a browsing session, the limited commerce event data may be displayed to the user as a less obtrusive notification in text form or otherwise. As another example, if the commerce event data is metadata such as a voice stream from the first user relating to the product, that voice stream may be streamed to the computing devices of the subset of subscribers and output to corresponding speakers or other audio transducers. Conversely, subscribers outside the subset may receive no voice stream and may instead receive a text notification indicating that the first user made a voice comment. Other examples will be apparent in light of the present description.

Figure 5:
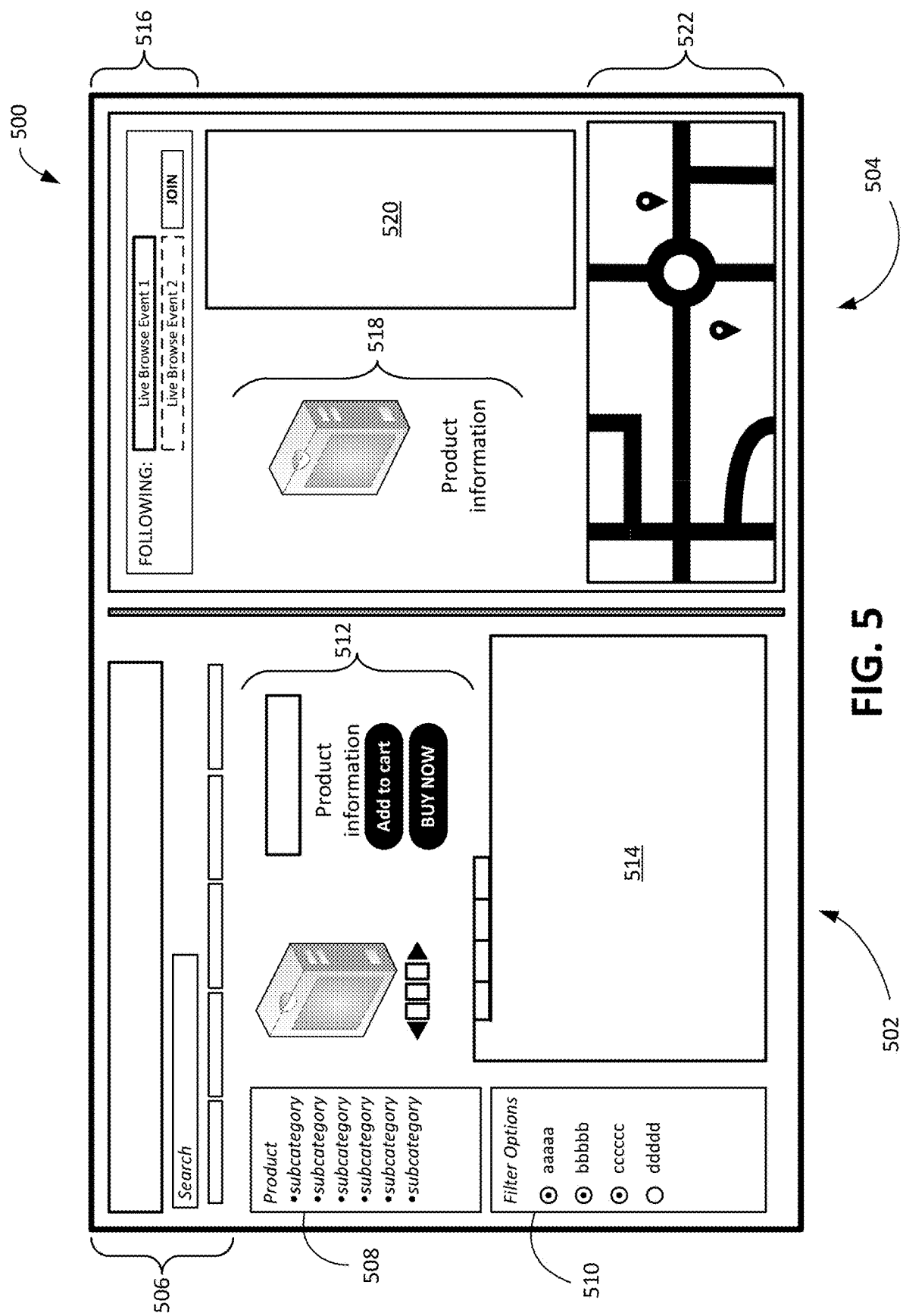
FIG. 5 shows an illustrative example of a graphical user interface on a computing device display screen to facilitate parallel active browsing sessions.

Reference is now made to FIG. 5 which shows an illustrative example of a graphical user interface (GUI) 500 generated by a browsing application on a computing device. The GUI 500 in this example presumes display on a tablet or monitor. If the computing device is a mobile smartphone or other device with a smaller display form factor, the GUI 500 may be simplified further.

The GUI 500 is rendered by the browsing application and displayed on the computing device in connection with a browsing session via the e-commerce platform, where a live browse event has been subscribed to.

In this example, the GUI 500 is split into two portions. A first portion 502 is dedicated to the user's active browsing session. In some cases, the first portion 502 may render a merchant website in the expected manner. For example, the first portion 502 may display title bar information, logos, or menus in area 506. Further sidebar menu options may appear in area 508. Product search or filter options may appear in area 510. Product item details may appear in area 512. The product item details may include one or more product images, pricing, size options, availability information, or other such details. Area 512 may further include an "add to cart" and/or "buy" button or the like. Area 514 may display further product information, which may be available through selecting certain tabs. Area 514 may include customer review information and the like.

A second portion 504 of the GUI 500 may be designated for display of injected commerce event data from a live browse event to which the computing device has subscribed. In this example, the second portion 504 may include an event subscription field 516 that provides details on which event or events have been subscribed to. The event subscription field 516 may signal which events are live, such as through a graphical element like a pulsing green light or a highlight around the event label or the like. The event subscription field 516 may further provide selectable buttons or links associated with the events; for example, selecting the event label may generate a navigation request to browse the same merchant store at which the live browse event is currently taking place.

The second portion 504 may further include a commerce event area 518 into which commerce event data from the live browse event is injected. The nature of the displayed data in the commerce event area 518 may vary depending on the type of commerce event. For example, if the commerce event relates to display of a certain product item, then the commerce event area 518 may display an image of that item and details regarding the item being viewed by the event host. In some cases, the commerce event area 518 may provide a button or link to cause generation of a navigation request in relation to the user's own browsing session displayed in the first portion 502, so as to navigate to the same product page at the merchant and display that page in the first portion 502.

The second portion 504 may further include a chat area 520 in which comments from the subscribers, the user, or the event host are displayed in a live stream. In some examples, the chat area 520 may be a text chat area. In some examples, the chat area 520 may be a video chat area displaying streaming video from the live browse event, such as from the camera of the computing device of the event host.

The second portion 504 may also include a map area 522. The map area 522 may be a geographical map obtained from a geographic information system, such as Google™ Maps or the like. The map area 522 may be a notional map displaying the layout of a virtual shopping mall, for example. The locations, real or virtual, of various merchants may be labelled on the map in some implementations. An icon or marker may be displayed on the map indicating the "location" of the user in terms of which merchant they are currently browsing. In some cases, further icons may indicate the location of the event host, of other subscribers, or of other live browse events. In some cases, selecting a merchant location or an icon on the map may cause the user's browsing session to transmit a request for navigation to a corresponding location, such as a corresponding merchant's online store.

While the GUI 500 shows is one example, it will be appreciated that in other embodiments, the GUI may have fewer or additional areas, may be organized in a different matter, may only have a first portion and may have a designated area or notification bar for display of commerce events, or may otherwise present or output the commerce event data.

In one example implementation, the map area 522 may be expanded to provide for a geographic map. For instance a "world" or "country" view may be provided and cities in which live browse events are available may be indicated or highlighted on the map. Navigation to one of those cities through selection of the city or a corresponding icon may provide a city map with icons indicating the available live browse events ongoing in connection with merchant locations in that city thereby enabling a user to easily navigate to and select a live browse event to which to subscribe based on interest in shopping in a particular city.

In one example application, when a user joins (or rejoins) a live browse event by subscribing to the event or by navigating to the same after having subscribed to the event earlier, the user may be given an option of a summary. The summary may be a condensed highlight of earlier commerce events that preceded the user's subscription or the user's arrival at the same merchant. The condensed highlights may be a summary list of purchased items, merchants visited, or other details of the shopping event thus far, for example.

In some cases, a live browse event may be "recorded" in that the commerce event data from the live browse event is saved by the server and then condensed into a highlight package. The highlight package may be available for viewing by other users in some cases. In some instances, the recording records the timing of the commerce events, and enables real-time playback. In this case, after the live browse event has concluded, a user may nevertheless choose to "parallel shop" with the event host. As live browse events are "re-run" alongside the user's own browsing session, the injected commerce events are based on the recording of commerce events at the server rather than live commerce events from the host's computing device. In such a "playback" situation, the user may be permitted to fast forward, pause, or rewind the live browse event in some implementations.

Live browse events may be suggested to users based on their purchase history, such as having visited similar or the same merchants in the past. In some cases, a live browse event may be suggested to a user based on the event host viewing, commenting on, or purchasing a product item that the user previously viewed or purchased. In this manner, a user may be prompted to follow along as a style guru or influencer engages in a shopping event relating to that product item and related accessories or complementary items. As an illustration, if a user has purchased a particular blouse, a live browse event may be suggested to the user if the event host purchases the same blouse so that the user may shop alongside an event host that has a similar style or taste in clothing, or that may be expected to purchase complementary or matching skirts, pants, shoes, or accessories.

Many of the above-described examples assume a system in which multiple merchants are hosted by an e-commerce platform, wherein the e-commerce platform provides for a live browse manager that facilitates live browse events and subscription to those events. Although implementation on an e-commerce platform, as such, is not required, it may be illustrative to provide further details regarding the components and operations of one or more example e-commerce platforms.

An Example e-Commerce Platform

Figure 6:
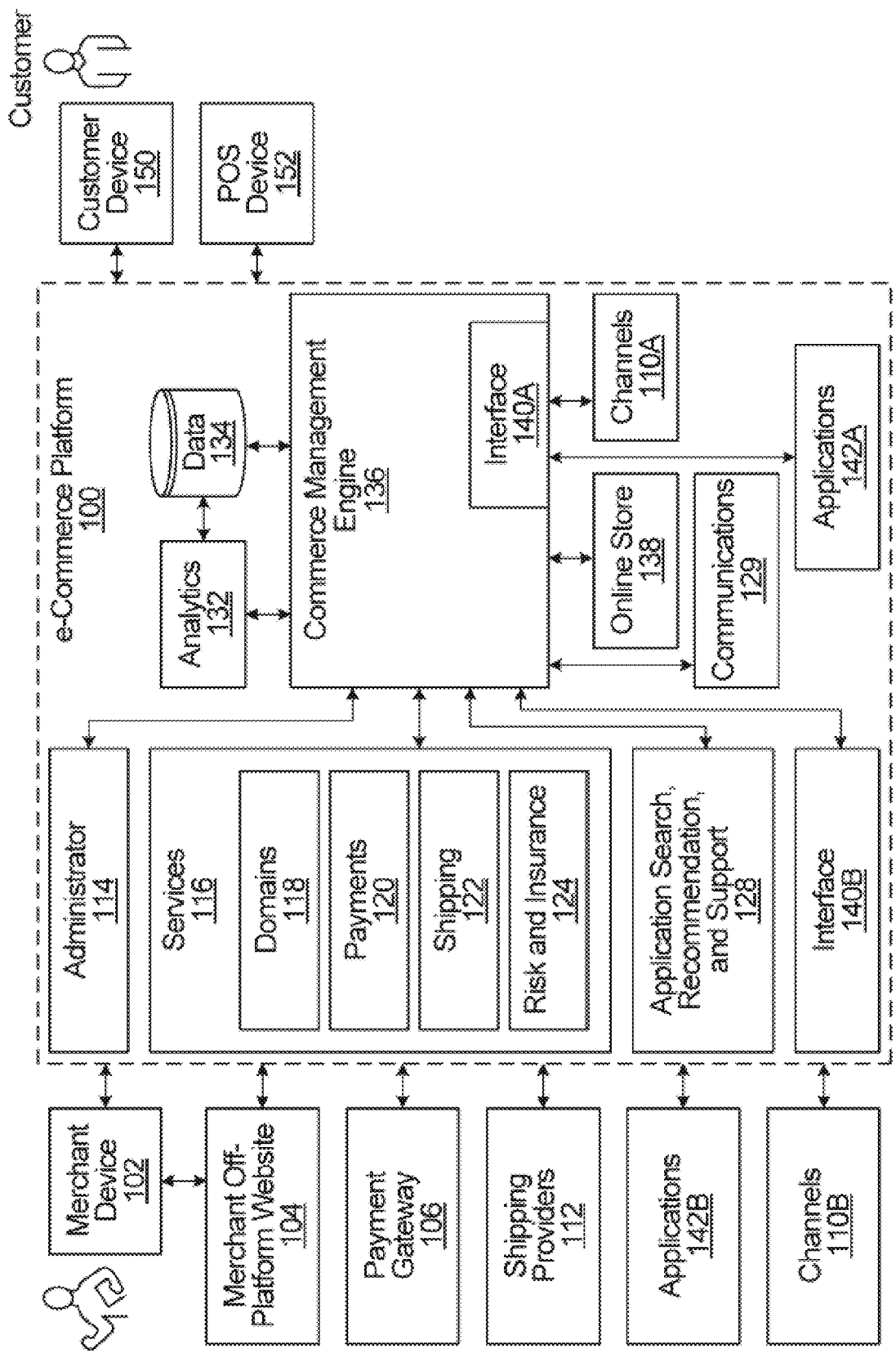
FIG. 6 is a block diagram of an e-commerce platform, according to an example embodiment.

FIG. 6 illustrates the example e-commerce platform 100, according to one embodiment. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including, for example, physical products, digital content (e.g., music, videos, games), software, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, consumer, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like. Furthermore, it may be recognized that while a given user may act in a given role (e.g., as a merchant) and their associated device may be referred to accordingly (e.g., as a merchant device) in one context, that same individual may act in a different role in another context (e.g., as a customer) and that same or another associated device may be referred to accordingly (e.g., as a customer device). For example, an individual may be a merchant for one type of product (e.g., shoes), and a customer/consumer of other types of products (e.g., groceries). In another example, an individual may be both a consumer and a merchant of the same type of product. In a particular example, a merchant that trades in a particular category of goods may act as a customer for that same category of goods when they order from a wholesaler (the wholesaler acting as merchant).

The e-commerce platform 100 provides merchants with online services/facilities to manage their business. The facilities described herein are shown implemented as part of the platform 100 but could also be configured separately from the platform 100, in whole or in part, as stand-alone services. Furthermore, such facilities may, in some embodiments, may, additionally or alternatively, be provided by one or more providers/entities.

In the example of FIG. 6, the facilities are deployed through a machine, service or engine that executes computer software, modules, program codes, and/or instructions on one or more processors which, as noted above, may be part of or external to the platform 100. Merchants may utilize the e-commerce platform 100 for enabling or managing commerce with customers, such as by implementing an e-commerce experience with customers through an online store 138, applications 142A-B, channels 110A-B, and/or through point of sale (POS) devices 152 in physical locations (e.g., a physical storefront or other location such as through a kiosk, terminal, reader, printer, 3D printer, and the like). A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform 100), an application 142B, and the like. However, even these 'other' merchant commerce facilities may be incorporated into or communicate with the e-commerce platform 100, such as where POS devices 152 in a physical store of a merchant are linked into the e-commerce platform 100, where a merchant off-platform website 104 is tied into the e-commerce platform 100, such as, for example, through 'buy buttons' that link content from the merchant off platform website 104 to the online store 138, or the like.

The online store 138 may represent a multi-tenant facility comprising a plurality of virtual storefronts. In embodiments, merchants may configure and/or manage one or more storefronts in the online store 138, such as, for example, through a merchant device 102 (e.g., computer, laptop computer, mobile computing device, and the like), and offer products to customers through a number of different channels 110A-B (e.g., an online store 138; an application 142A-B; a physical storefront through a POS device 152; an electronic marketplace, such, for example, through an electronic buy button integrated into a website or social media channel such as on a social network, social media page, social media messaging system; and/or the like). A merchant may sell across channels 110A-B and then manage their sales through the e-commerce platform 100, where channels 110A may be provided as a facility or service internal or external to the e-commerce platform 100. A merchant may, additionally or alternatively, sell in their physical retail store, at pop ups, through wholesale, over the phone, and the like, and then manage their sales through the e-commerce platform 100. A merchant may employ all or any combination of these operational modalities. Notably, it may be that by employing a variety of and/or a particular combination of modalities, a merchant may improve the probability and/or volume of sales. Throughout this disclosure the terms online store 138 and storefront may be used synonymously to refer to a merchant's online e-commerce service offering through the e-commerce platform 100, where an online store 138 may refer either to a collection of storefronts supported by the e-commerce platform 100 (e.g., for one or a plurality of merchants) or to an individual merchant's storefront (e.g., a merchant's online store).

In some embodiments, a customer may interact with the platform 100 through a customer device 150 (e.g., computer, laptop computer, mobile computing device, or the like), a POS device 152 (e.g., retail device, kiosk, automated (self-service) checkout system, or the like), and/or any other commerce interface device known in the art. The e-commerce platform 100 may enable merchants to reach customers through the online store 138, through applications 142A-B, through POS devices 152 in physical locations (e.g., a merchant's storefront or elsewhere), to communicate with customers via electronic communication facility 129, and/or the like so as to provide a system for reaching customers and facilitating merchant services for the real or virtual pathways available for reaching and interacting with customers.

In some embodiments, and as described further herein, the e-commerce platform 100 may be implemented through a processing facility. Such a processing facility may include a processor and a memory. The processor may be a hardware processor. The memory may be and/or may include a transitory memory such as for example, random access memory (RAM), and/or a non-transitory memory such as, for example, a non-transitory computer readable medium such as, for example, persisted storage (e.g., magnetic storage). The processing facility may store a set of instructions (e.g., in the memory) that, when executed, cause the e-commerce platform 100 to perform the e-commerce and support functions as described herein. The processing facility may be or may be a part of one or more of a server, client, network infrastructure, mobile computing platform, cloud computing platform, stationary computing platform, and/or some other computing platform, and may provide electronic connectivity and communications between and amongst the components of the e-commerce platform 100, merchant devices 102, payment gateways 106, applications 142A-B, channels 110A-B, shipping providers 112, customer devices 150, point of sale devices 152, etc. In some implementations, the processing facility may be or may include one or more such computing devices acting in concert. For example, it may be that a plurality of co-operating computing devices serves as/to provide the processing facility. The e-commerce platform 100 may be implemented as or using one or more of a cloud computing service, software as a service (SaaS), infrastructure as a service (IaaS), platform as a service (PaaS), desktop as a service (DaaS), managed software as a service (MSaaS), mobile backend as a service (MBaaS), information technology management as a service (ITMaaS), and/or the like. For example, it may be that the underlying software implementing the facilities described herein (e.g., the online store 138) is provided as a service, and is centrally hosted (e.g., and then accessed by users via a web browser or other application, and/or through customer devices 150, POS devices 152, and/or the like). In some embodiments, elements of the e-commerce platform 100 may be implemented to operate and/or integrate with various other platforms and operating systems.

In some embodiments, the facilities of the e-commerce platform 100 (e.g., the online store 138) may serve content to a customer device 150 (using data repository 134) such as, for example, through a network 420 connected to the e-commerce platform 100. For example, the online store 138 may serve or send content in response to requests for data from the customer device 150, where a browser (or other application) connects to the online store 138 through a network 420 using a network communication protocol (e.g., an internet protocol). The content may be written in machine readable language and may include Hypertext Markup Language (HTML), template language, JavaScript, and the like, and/or any combination thereof.

In some embodiments, online store 138 may be or may include service instances that serve content to customer devices and allow customers to browse and purchase the various products available (e.g., add them to a cart, purchase through a buy-button, and the like). Merchants may also customize the look and feel of their website through a theme system, such as, for example, a theme system where merchants can select and change the look and feel of their online store 138 by changing their theme while having the same underlying product and business data shown within the online store's product information. It may be that themes can be further customized through a theme editor, a design interface that enables users to customize their website's design with flexibility. Additionally or alternatively, it may be that themes can, additionally or alternatively, be customized using theme-specific settings such as, for example, settings as may change aspects of a given theme, such as, for example, specific colors, fonts, and pre-built layout schemes. In some implementations, the online store may implement a content management system for website content. Merchants may employ such a content management system in authoring blog posts or static pages and publish them to their online store 138, such as through blogs, articles, landing pages, and the like, as well as configure navigation menus. Merchants may upload images (e.g., for products), video, content, data, and the like to the e-commerce platform 100, such as for storage by the system (e.g., in data repository 134). In some embodiments, the e-commerce platform 100 may provide functions for manipulating such images and content such as, for example, functions for resizing images, associating an image with a product, adding and associating text with an image, adding an image for a new product variant, protecting images, and the like.

As described herein, the e-commerce platform 100 may provide merchants with sales and marketing services for products through a number of different channels 110A-B, including, for example, the online store 138, applications 142A-B, as well as through physical POS devices 152 as described herein. The e-commerce platform 100 may, additionally or alternatively, include business support services 116, an administrator 114, a warehouse management system, and the like associated with running an on-line business, such as, for example, one or more of providing a domain registration service 118 associated with their online store, payment services 120 for facilitating transactions with a customer, shipping services 122 for providing customer shipping options for purchased products, fulfillment services for managing inventory, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may be configured with shipping services 122 (e.g., through an e-commerce platform shipping facility or through a third-party shipping carrier), to provide various shipping-related information to merchants and/or their customers such as, for example, shipping label or rate information, real-time delivery updates, tracking, and/or the like.

Figure 7:
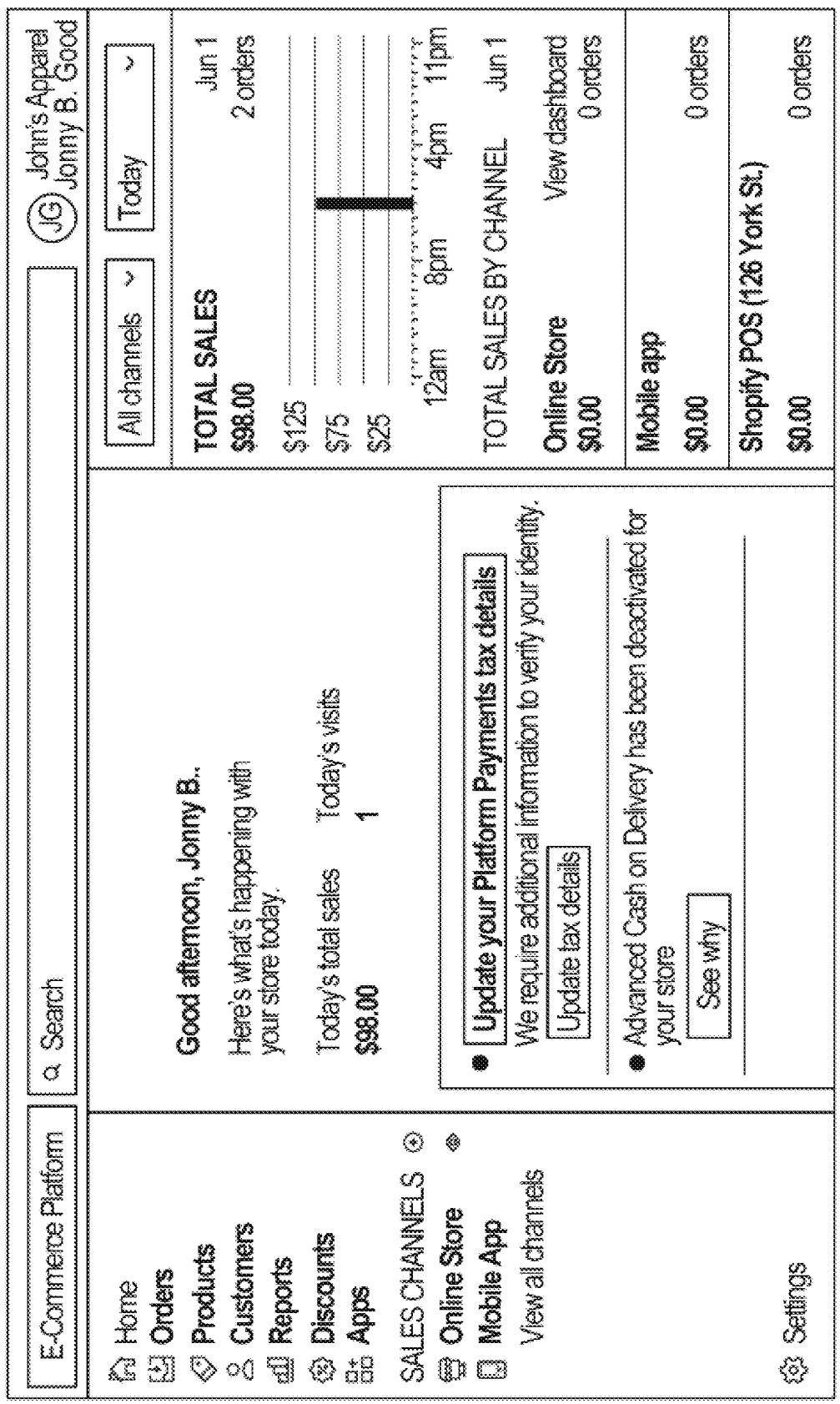
FIG. 7 is an example of a home page of an administrator, according to an example embodiment.

FIG. 7 depicts a non-limiting embodiment for a home page of an administrator 114. The administrator 114 may be referred to as an administrative console and/or an administrator console. The administrator 114 may show information about daily tasks, a store's recent activity, and the next steps a merchant can take to build their business. In some embodiments, a merchant may log in to the administrator 114 via a merchant device 102 (e.g., a desktop computer or mobile device), and manage aspects of their online store 138, such as, for example, viewing the online store's 138 recent visit or order activity, updating the online store's 138 catalog, managing orders, and/or the like. In some embodiments, the merchant may be able to access the different sections of the administrator 114 by using a sidebar, such as the one shown on FIG. 7. Sections of the administrator 114 may include various interfaces for accessing and managing core aspects of a merchant's business, including orders, products, customers, available reports and discounts. The administrator 114 may, additionally or alternatively, include interfaces for managing sales channels for a store including the online store 138, mobile application(s) made available to customers for accessing the store (Mobile App), POS devices, and/or a buy button. The administrator 114 may, additionally or alternatively, include interfaces for managing applications (apps) installed on the merchant's account; and settings applied to a merchant's online store 138 and account. A merchant may use a search bar to find products, pages, or other information in their store.

More detailed information about commerce and visitors to a merchant's online store 138 may be viewed through reports or metrics. Reports may include, for example, acquisition reports, behavior reports, customer reports, finance reports, marketing reports, sales reports, product reports, and custom reports. The merchant may be able to view sales data for different channels 110A-B from different periods of time (e.g., days, weeks, months, and the like), such as by using drop-down menus. An overview dashboard may also be provided for a merchant who wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, order updates, and the like. Notifications may be provided to assist a merchant with navigating through workflows configured for the online store 138, such as, for example, a payment workflow, an order fulfillment workflow, an order archiving workflow, a return workflow, and the like.

The e-commerce platform 100 may provide for a communications facility 129 and associated merchant interface for providing electronic communications and marketing, such as utilizing an electronic messaging facility for collecting and analyzing communication interactions between merchants, customers, merchant devices 102, customer devices 150, POS devices 152, and the like, to aggregate and analyze the communications, such as for increasing sale conversions, and the like. For instance, a customer may have a question related to a product, which may produce a dialog between the customer and the merchant (or an automated processor-based agent/chatbot representing the merchant), where the communications facility 129 is configured to provide automated responses to customer requests and/or provide recommendations to the merchant on how to respond such as, for example, to improve the probability of a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between the e-commerce platform 100 and a merchant's bank account, and the like. The financial facility 120 may also provide merchants and buyers with financial support, such as through the lending of capital (e.g., lending funds, cash advances, and the like) and provision of insurance. In some embodiments, online store 138 may support a number of independently administered storefronts and process a large volume of transactional data on a daily basis for a variety of products and services. Transactional data may include any customer information indicative of a customer, a customer account or transactions carried out by a customer such as. for example, contact information, billing information, shipping information, returns/refund information, discount/offer information, payment information, or online store events or information such as page views, product search information (search keywords, click-through events), product reviews, abandoned carts, and/or other transactional information associated with business through the e-commerce platform 100. In some embodiments, the e-commerce platform 100 may store this data in a data facility 134. Referring again to FIG. 6, in some embodiments the e-commerce platform 100 may include a commerce management engine 136 such as may be configured to perform various workflows for task automation or content management related to products, inventory, customers, orders, suppliers, reports, financials, risk and fraud, and the like. In some embodiments, additional functionality may, additionally or alternatively, be provided through applications 142A-B to enable greater flexibility and customization required for accommodating an ever-growing variety of online stores, POS devices, products, and/or services. Applications 142A may be components of the e-commerce platform 100 whereas applications 142B may be provided or hosted as a third-party service external to e-commerce platform 100. The commerce management engine 136 may accommodate store-specific workflows and in some embodiments, may incorporate the administrator 114 and/or the online store 138.

Implementing functions as applications 142A-B may enable the commerce management engine 136 to remain responsive and reduce or avoid service degradation or more serious infrastructure failures, and the like.

Although isolating online store data can be important to maintaining data privacy between online stores 138 and merchants, there may be reasons for collecting and using cross-store data, such as for example, with an order risk assessment system or a platform payment facility, both of which require information from multiple online stores 138 to perform well. In some embodiments, it may be preferable to move these components out of the commerce management engine 136 and into their own infrastructure within the e-commerce platform 100.

Platform payment facility 120 is an example of a component that utilizes data from the commerce management engine 136 but is implemented as a separate component or service. The platform payment facility 120 may allow customers interacting with online stores 138 to have their payment information stored safely by the commerce management engine 136 such that they only have to enter it once. When a customer visits a different online store 138, even if they have never been there before, the platform payment facility 120 may recall their information to enable a more rapid and/or potentially less-error prone (e.g., through avoidance of possible mis-keying of their information if they needed to instead re-enter it) checkout. This may provide a cross-platform network effect, where the e-commerce platform 100 becomes more useful to its merchants and buyers as more merchants and buyers join, such as because there are more customers who checkout more often because of the ease of use with respect to customer purchases. To maximize the effect of this network, payment information for a given customer may be retrievable and made available globally across multiple online stores 138.

For functions that are not included within the commerce management engine 136, applications 142A-B provide a way to add features to the e-commerce platform 100 or individual online stores 138. For example, applications 142A-B may be able to access and modify data on a merchant's online store 138, perform tasks through the administrator 114, implement new flows for a merchant through a user interface (e.g., that is surfaced through extensions/API), and the like. Merchants may be enabled to discover and install applications 142A-B through application search, recommendations, and support 128. In some embodiments, the commerce management engine 136, applications 142A-B, and the administrator 114 may be developed to work together. For instance, application extension points may be built inside the commerce management engine 136, accessed by applications 142A and 142B through the interfaces 140B and 140A to deliver additional functionality, and surfaced to the merchant in the user interface of the administrator 114.

In some embodiments, applications 142A-B may deliver functionality to a merchant through the interface 140A-B, such as where an application 142A-B is able to surface transaction data to a merchant (e.g., App: "Engine, surface my app data in the Mobile App or administrator 114"), and/or where the commerce management engine 136 is able to ask the application to perform work on demand (Engine: "App, give me a local tax calculation for this checkout").

Applications 142A-B may be connected to the commerce management engine 136 through an interface 140A-B (e.g., through REST (REpresentational State Transfer) and/or GraphQL APIs) to expose the functionality and/or data available through and within the commerce management engine 136 to the functionality of applications. For instance, the e-commerce platform 100 may provide API interfaces 140A-B to applications 142A-B which may connect to products and services external to the platform 100. The flexibility offered through use of applications and APIs (e.g., as offered for application development) enable the e-commerce platform 100 to better accommodate new and unique needs of merchants or to address specific use cases without requiring constant change to the commerce management engine 136. For instance, shipping services 122 may be integrated with the commerce management engine 136 through a shipping or carrier service API, thus enabling the e-commerce platform 100 to provide shipping service functionality without directly impacting code running in the commerce management engine 136.

Depending on the implementation, applications 142A-B may utilize APIs to pull data on demand (e.g., customer creation events, product change events, or order cancelation events, etc.) or have the data pushed when updates occur. A subscription model may be used to provide applications 142A-B with events as they occur or to provide updates with respect to a changed state of the commerce management engine 136. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time or near-real time.

In some embodiments, the e-commerce platform 100 may provide one or more of application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, and the like. In some embodiments, applications 142A-B may be assigned an application identifier (ID), such as for linking to an application (e.g., through an API), searching for an application, making application recommendations, and the like.

Applications 142A-B may be grouped roughly into three categories: customer-facing applications, merchant-facing applications, integration applications, and the like. Customer-facing applications 142A-B may include an online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways 106.

As such, the e-commerce platform 100 can be configured to provide an online shopping experience through a flexible system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products through a number of different channels 110A-B such as, for example, the merchant's online store 138, a physical storefront through a POS device 152; an electronic marketplace, through an electronic buy button integrated into a website or a social media channel). In some cases, channels 110A-B may be modeled as applications 142A-B A merchandising component in the commerce management engine 136 may be configured for creating, and managing product listings (using product data objects or models for example) to allow merchants to describe what they want to sell and where they sell it. The association between a product listing and a channel may be modeled as a product publication and accessed by channel applications, such as via a product listing API. A product may have many attributes and/or characteristics, like size and color, and many variants that expand the available options into specific combinations of all the attributes, like a variant that is size extra-small and green, or a variant that is size large and blue. Products may have at least one variant (e.g., a "default variant") created for a product without any options. To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Product listings may include 2D images, 3D images or models, which may be viewed through a virtual or augmented reality interface, and the like.

In some embodiments, a shopping cart object is used to store or keep track of the products that the customer intends to buy. The shopping cart object may be channel specific and can be composed of multiple cart line items, where each cart line item tracks the quantity for a particular product variant. Since adding a product to a cart does not imply any commitment from the customer or the merchant, and the expected lifespan of a cart may be in the order of minutes (not days), cart objects/data representing a cart may be persisted to an ephemeral data store.

The customer then proceeds to checkout. A checkout object or page generated by the commerce management engine 136 may be configured to receive customer information to complete the order such as the customer's contact information, billing information and/or shipping details. If the customer inputs their contact information but does not proceed to payment, the e-commerce platform 100 may (e.g., via an abandoned checkout component) to transmit a message to the customer device 150 to encourage the customer to complete the checkout. For those reasons, checkout objects can have much longer lifespans than cart objects (hours or even days) and may therefore be persisted. Customers then pay for the content of their cart resulting in the creation of an order for the merchant. In some embodiments, the commerce management engine 136 may be configured to communicate with various payment gateways and services 106 (e.g., online payment systems, mobile payment systems, digital wallets, credit card gateways) via a payment processing component. The actual interactions with the payment gateways 106 may be provided through a card server environment. At the end of the checkout process, an order is created. An order is a contract of sale between the merchant and the customer where the merchant agrees to provide the goods and services listed on the order (e.g., order line items, shipping line items, and the like) and the customer agrees to provide payment (including taxes). Once an order is created, an order confirmation notification may be sent to the customer and an order placed notification sent to the merchant via a notification component. Inventory may be reserved when a payment processing job starts to avoid over-selling (e.g., merchants may control this behavior using an inventory policy or configuration for each variant). Inventory reservation may have a short time span (minutes) and may need to be fast and scalable to support flash sales or "drops", which are events during which a discount, promotion or limited inventory of a product may be offered for sale for buyers in a particular location and/or for a particular (usually short) time. The reservation is released if the payment fails. When the payment succeeds, and an order is created, the reservation is converted into a permanent (long-term) inventory commitment allocated to a specific location. An inventory component of the commerce management engine 136 may record where variants are stocked, and tracks quantities for variants that have inventory tracking enabled. It may decouple product variants (a customer-facing concept representing the template of a product listing) from inventory items (a merchant-facing concept that represents an item whose quantity and location is managed). An inventory level component may keep track of quantities that are available for sale, committed to an order or incoming from an inventory transfer component (e.g., from a vendor).

The merchant may then review and fulfill (or cancel) the order. A review component of the commerce management engine 136 may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) before it marks the order as paid. The merchant may now prepare the products for delivery. In some embodiments, this business process may be implemented by a fulfillment component of the commerce management engine 136. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. Alternatively, an API fulfillment service may trigger a third-party application or service to create a fulfillment record for a third-party fulfillment service. Other possibilities exist for fulfilling an order. If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

Implementations

The methods and systems described herein may be deployed in part or in whole through a machine that executes computer software, program codes, and/or instructions on a processor. The processor may be part of a server, cloud server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more threads. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In some embodiments, the process may be a dual core processor, quad core processors, other chip-level multiprocessor and the like that combine two or more independent cores (called a die).

The methods and systems described herein may be deployed in part or in whole through a machine that executes computer software on a server, cloud server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more locations without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more locations without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented in different devices which may operate in wired or wireless networks. Examples of wireless networks include 4th Generation (4G) networks (e.g., Long-Term Evolution (LTE)) or 5th Generation (5G) networks, as well as non-cellular networks such as Wireless Local Area Networks (WLANs). However, the principles described therein may equally apply to other types of networks.

The operations, methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g., USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another, such as from usage data to a normalized usage dataset.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable devices, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above, and combinations thereof may be embodied in computer executable code that, when executing on one or more computing devices, performs the steps thereof. In another aspect, the methods may be embodied in systems that perform the steps thereof and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

The invention claimed is:

1. A computer-implemented method, comprising:
   receiving commerce event data relating to a first active browsing session by a first user device, wherein the first active browsing session is associated with a first merchant store;
   identifying a set of users subscribed to the first active browsing session and a subset of the set of users, wherein the users of the subset are engaged in respective active browsing sessions associated with the first merchant store; and
   selectively transmitting commerce event data based on whether the commerce event data is major commerce event data or minor commerce event data,
     wherein when the commerce event data is major commerce event data, the major commerce event data is transmitted to a user device associated with each user in the set of users subscribed to the first active browsing session for output of a notification regarding the major commerce event data,
     wherein when the commerce event data is minor commerce event data, the minor commerce event data is transmitted to a user device associated with each user in the subset of users for injection into that user's respective active browsing session and not to user devices associated with users not in the subset of users,
     and wherein the minor commerce event data include actions within the first active browsing session associated with the first merchant store, and the major commerce event data includes the first active browsing session navigating from the first merchant store to a different merchant store.

2. The method claimed in claim 1, wherein the minor commerce event data includes one or more of selection of a product to view details, selection of a product feature, addition of a product item to a shopping cart, or purchase of a product item.

3. The method claimed in claim 1, further comprising determining session state for each of the respective active browsing sessions, wherein session state is one of a browsing state, a shopping cart review state, or a purchase completion state, and wherein transmitting the minor commerce event data includes transmitting to the user device associated with each user in the subset of users not in a purchase completion state.

4. The method claimed in claim 1, further comprising receiving further commerce event data and re-filtering the set of users to select a second subset of users, wherein a second user in the subset of users is not included in the second subset of users because the second user has altered its respective active browsing session to be associated with a second merchant different from the first merchant.

5. The method claimed in claim 1, wherein the minor commerce event data includes user commentary data input at the first user device, wherein the user commentary data includes one or more of text data, voice data, or video data, and wherein the user commentary data is associated with one or more products displayed in the first active browsing session.

6. The method claimed in claim 5, wherein transmitting includes transmitting the user commentary data and data regarding the one or more products associated with the user commentary data.

7. The method claimed in claim 1, wherein the set of users are cross-subscribed to each other's respective active browsing sessions in a group browsing event.

8. The method claimed in claim 1, further including receiving the minor commerce event data at the user device associated with each user in the subset and, at each user device, determining whether to output a notification regarding the minor commerce event data.

9. The method claimed in claim 8, wherein determining whether to output the notification includes determining session state for each of the respective active browsing sessions, wherein session state is one of an active browsing state, a shopping cart review state, or a purchase completion state, and outputting the notification if the respective active browsing session is not in the purchase completion state.

10. The method claimed in claim 1, further including receiving the minor commerce event data, at the user device associated with each user in the subset and, at each user device, outputting a user interface having a first portion for display associated with the respective active browsing session and having a second portion for display associated with the received minor commerce event data.

11. The method claimed in claim 10, wherein the second portion is selectable and, when selected, causes the respective browsing session to display a product identified by the minor commerce event data.

12. A computing system, comprising:
   a processor;
   a memory storing computer-executable instructions that, when executed by the processor, are to cause the processor to:
     receive commerce event data relating to a first active browsing session by a first user device, wherein the first active browsing session is associated with a first merchant store;
     identify a set of users subscribed to the first active browsing session and a subset of the set of users, wherein the users of the subset are engaged in respective active browsing sessions associated with the first merchant store; and selectively transmit the commerce event data based on whether the commerce event data is major commerce event data or minor commerce event data, wherein when the commerce event data is major commerce event data, the major commerce event data is transmitted to a user device associated with each user in the set of users subscribed to the first active browsing session for output of a notification regarding the major commerce event data, wherein when the commerce event data is minor commerce event data, the minor commerce event data is transmitted to a user device associated with each user in the subset of users for injection into that user's respective active browsing session and not to user devices associated with users not in the subset of users, and wherein the minor commerce event data include actions within the first active browsing session associated with the first merchant store, and the major commerce event data includes the first active browsing session navigating from the first merchant store to a different merchant store.

13. The computing system claimed in claim 12, wherein the minor commerce event data includes one or more of selection of a product to view details, selection of a product feature, addition of a product item to a shopping cart, or purchase of a product item.

14. The computing system claimed in claim 12, wherein the instructions, when executed, are to further cause the processor to determine session state for each of the respective active browsing sessions, wherein session state is one of a browsing state, a shopping cart review state, or a purchase completion state, and wherein the processor is to transmit the minor commerce event data by transmitting to the user device associated with each user in the subset of users not in a purchase completion state.

15. The computing system claimed in claim 12, wherein the instructions, when executed, are to further cause the processor to receive further commerce event data and to re-filter the set of users to select a second subset of users, wherein a second user in the subset of users is not included in the second subset of users because the second user has altered its respective active browsing session to be associated with a second merchant different from the first merchant.

16. The computing system claimed in claim 12, wherein the minor commerce event data includes user commentary data input at the first user device, wherein the user commentary data includes one or more of text data, voice data, or video data, and wherein the user commentary data is associated with one or more products displayed in the first active browsing session.

17. The computing system claimed in claim 16, wherein the instructions, when executed, are to cause the processor to transmit by transmitting the user commentary data and data regarding the one or more products associated with the user commentary data.

18. The computing system claimed in claim 12, wherein the set of users are cross-subscribed to each other's respective active browsing sessions in a group browsing event.

19. The computing system claimed in claim 12, wherein the instructions, when executed, are to cause the processor to generate a web page for the first merchant store having a first portion for display associated with the respective active browsing session and having a second portion for display associated with the commerce event data.

20. A non-transitory, computer-readable medium storing computer-executable instructions that, when executed by a processor, are to cause the processor to:

receive commerce event data relating to a first active browsing session by a first user device, wherein the first active browsing session is associated with a first merchant store;

identify a set of users subscribed to the first active browsing session and a subset of the set of users, wherein the users of the subset are engaged in respective active browsing sessions associated with the first merchant store; and selectively transmit the commerce event data based on whether the commerce event data is major commerce event data or minor commerce event data, wherein when the commerce event data is major commerce event data, the major commerce event data is transmitted to a user device associated with each user in the set of users subscribed to the first active browsing session for output of a notification regarding the major commerce event data, wherein when the commerce event data is minor commerce event data, the minor commerce event data is transmitted to a user device associated with each user in the subset of users for injection into that user's respective active browsing session and not to user devices associated with users not in the subset of users, and wherein the minor commerce event data include actions within the first active browsing session associated with the first merchant store, and the major commerce event data includes the first active browsing session navigating from the first merchant store to a different merchant store.

\* \* \* \* \*